US005499788A

United States Patent [19]

Rees

[11] Patent Number: 5,499,788
[45] Date of Patent: * Mar. 19, 1996

[54] MANUAL SEAT ADJUSTER

[75] Inventor: Richard W. A. Rees, Auburn Hills, Mich.

[73] Assignee: ITT Corporation, New York, N.Y.

[*] Notice: The portion of the term of this patent subsequent to Sep. 6, 2011, has been disclaimed.

[21] Appl. No.: 173,689

[22] Filed: Dec. 23, 1993

Related U.S. Application Data

[63] Continuation-in-part of Ser. No. 40,478, Mar. 31, 1993, Pat. No. 5,344,114.

[51] Int. Cl.$^6$ .................................................. F16M 13/00
[52] U.S. Cl. .................................... 248/430; 296/65.1
[58] Field of Search .................................. 248/430, 429, 248/424; 296/65.1

[56] References Cited

U.S. PATENT DOCUMENTS

| 1,726,597 | 9/1929 | Templeton . | |
|---|---|---|---|
| 2,031,248 | 2/1936 | Bishop . | |
| 2,472,593 | 6/1949 | King . | |
| 3,120,371 | 2/1964 | Dall . | |
| 3,258,240 | 6/1966 | Kirk . | |
| 3,507,472 | 4/1970 | Agee et al. . | |
| 3,740,014 | 6/1973 | Swenson et al. . | |
| 4,438,895 | 3/1984 | Rees | 248/396 |
| 4,445,661 | 5/1984 | Langmesser, Jr. et al. | 248/394 |
| 4,463,922 | 8/1984 | Rees | 248/429 |
| 4,487,459 | 12/1984 | Rees | 248/429 X |
| 4,511,187 | 4/1985 | Rees | 248/430 |
| 4,513,937 | 4/1985 | Langmesser, Jr. et al. | 248/394 |
| 4,527,767 | 7/1985 | Rees | 248/419 |
| 4,563,044 | 1/1986 | Rees | 296/65.1 |
| 4,572,469 | 2/1986 | Rees | 248/430 |
| 4,580,755 | 4/1986 | Rees | 248/430 |
| 4,653,821 | 3/1987 | Faust | 312/337 |
| 4,804,229 | 2/1989 | Nishino | 248/430 X |
| 4,821,989 | 4/1989 | Munakata et al. | 248/430 |
| 4,821,991 | 4/1989 | Aihara et al. | 248/430 |
| 4,948,189 | 8/1990 | Terada et al. | 296/65.1 |
| 4,969,622 | 11/1990 | Münchow et al. | 248/420 |
| 4,981,278 | 1/1991 | Rees | 248/430 |
| 5,048,787 | 9/1991 | Saitoh | 248/430 |
| 5,048,886 | 9/1991 | Ito et al. | 296/65.1 |
| 5,104,084 | 4/1992 | Kumagai et al. | 248/430 |
| 5,192,045 | 3/1993 | Yamada et al. | 248/430 |
| 5,344,114 | 9/1994 | Rees | 248/430 |

FOREIGN PATENT DOCUMENTS

| 127453 | 4/1948 | Australia . |
| 1417978 | 10/1965 | France . |
| 810471 | 8/1951 | Germany . |
| 3918424 | 12/1990 | Germany . |
| 4127503 | 2/1993 | Germany . |
| 828985 | 2/1960 | United Kingdom . |

Primary Examiner—Ramon O. Ramirez
Attorney, Agent, or Firm—Robert P. Seitter; J. Gordon Lewis

[57] ABSTRACT

A vehicle seat adjuster includes a pair of spaced upper tracks, each slidably mounted in one of a pair of lower tracks. A seat support arm connected to each upper track slidably extends through a slot formed in each lower track. A rod extends between each pair of track assemblies and releasably engages a notch formed in each support arm and one of a plurality of notches formed in the lower track to releasably lock the upper track in a stationary position relative to the lower track. A bearing conforming to the shape of the upper track is interposed between each upper and lower track. Support members are connected to each lower track to anchor each lower track to a vehicle floor. Cooperating resisting elements are formed in each upper and lower track pair and inter-engage under deforming load of the tracks and bearing to resist separation of the upper track from the lower track.

42 Claims, 8 Drawing Sheets

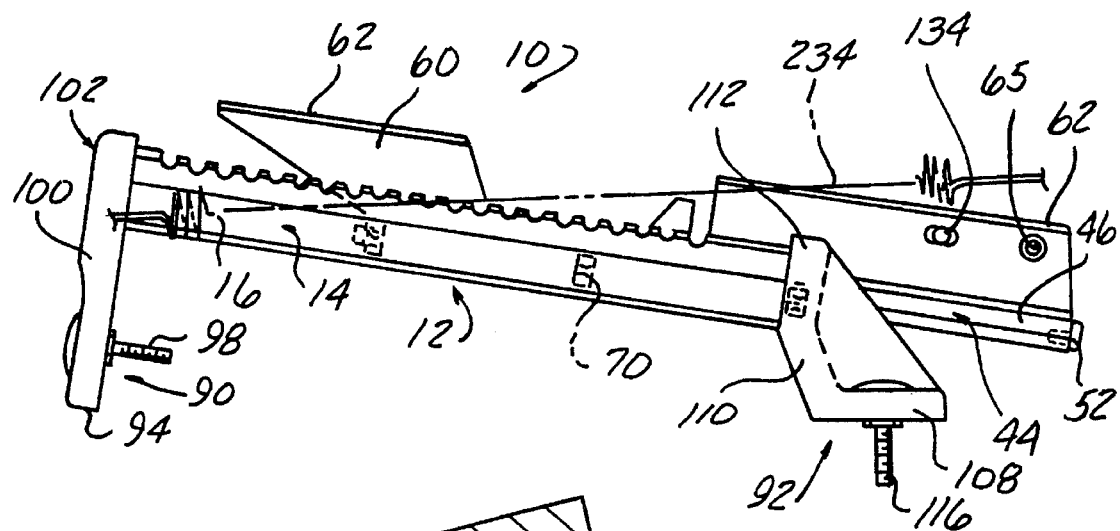
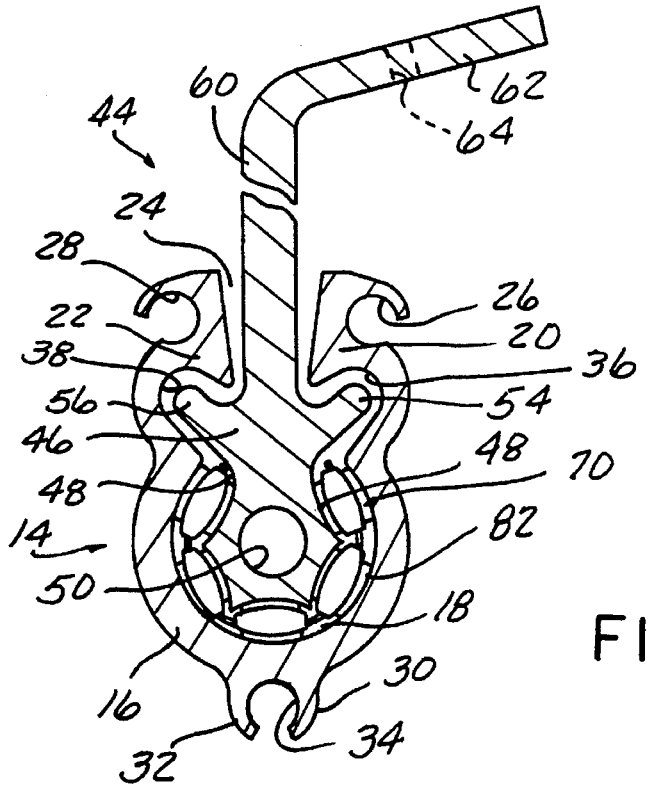
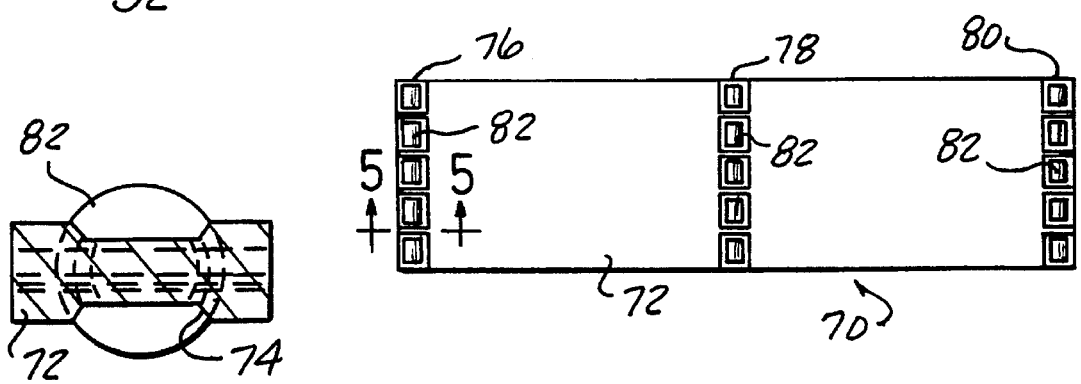

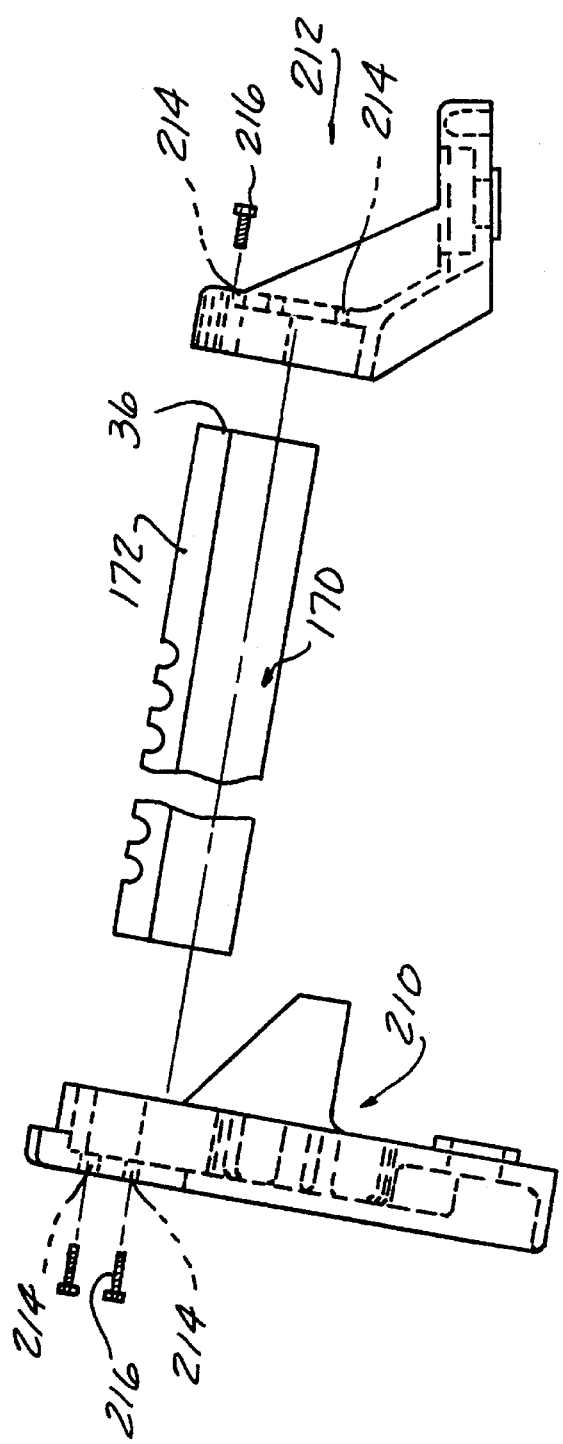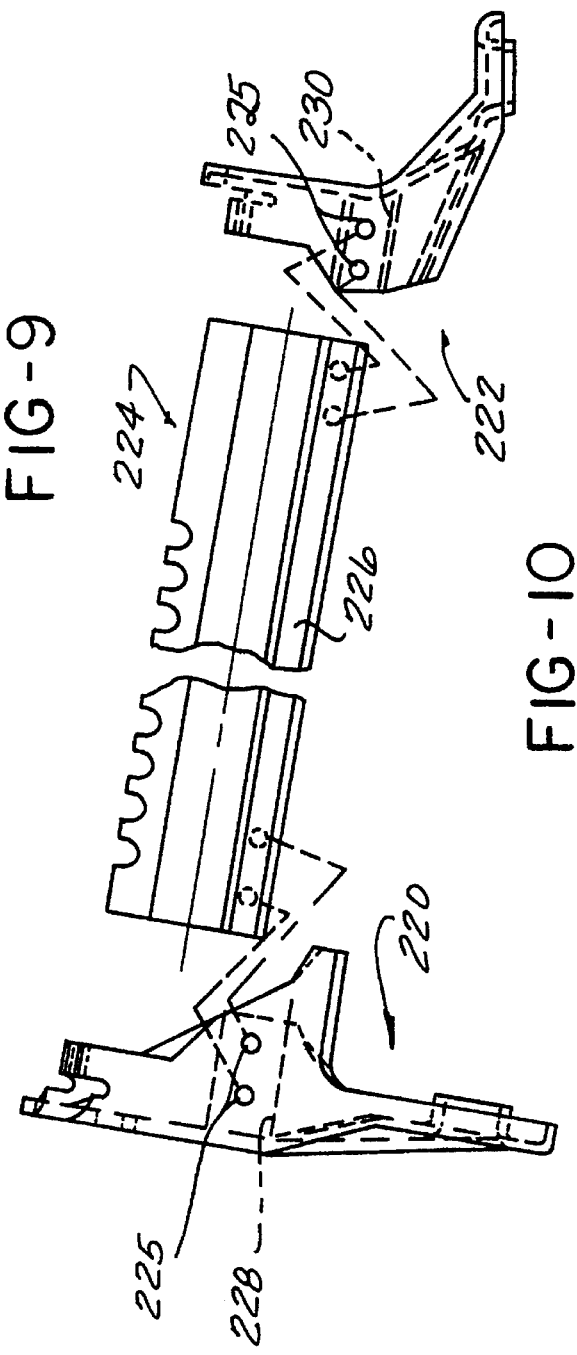

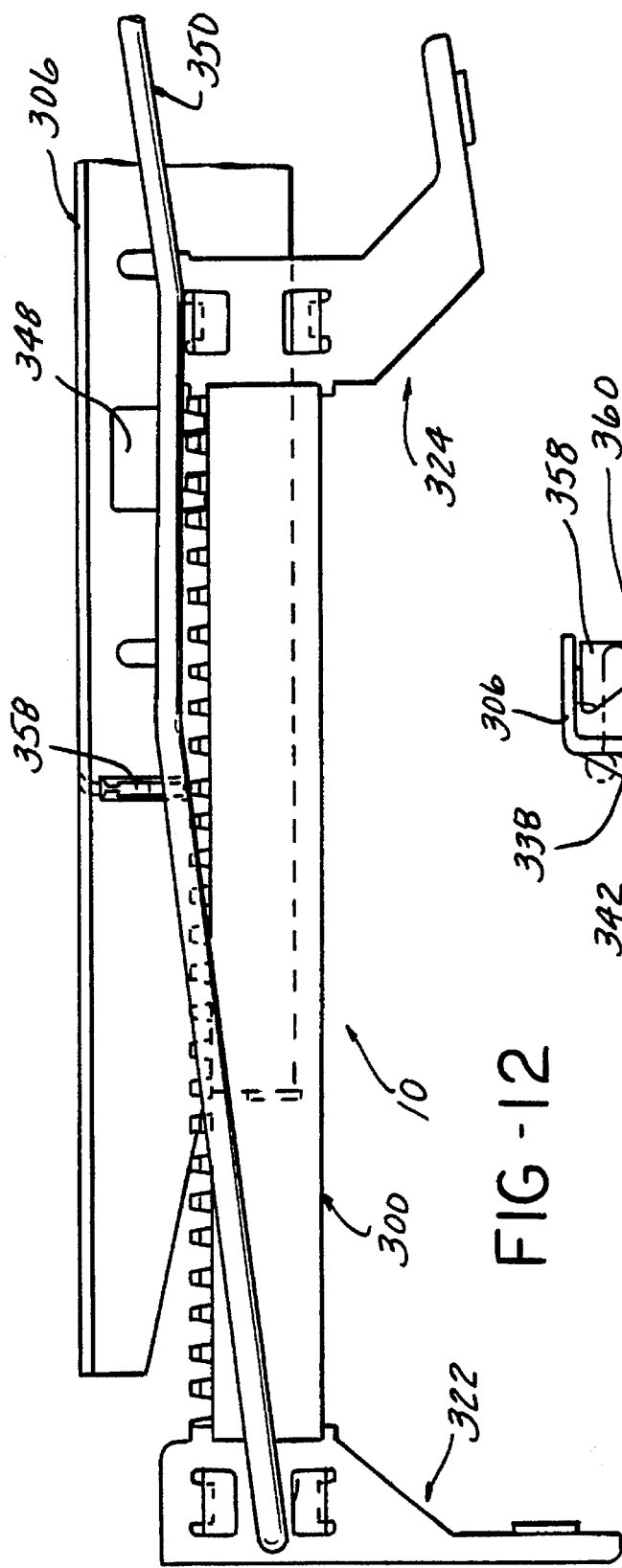
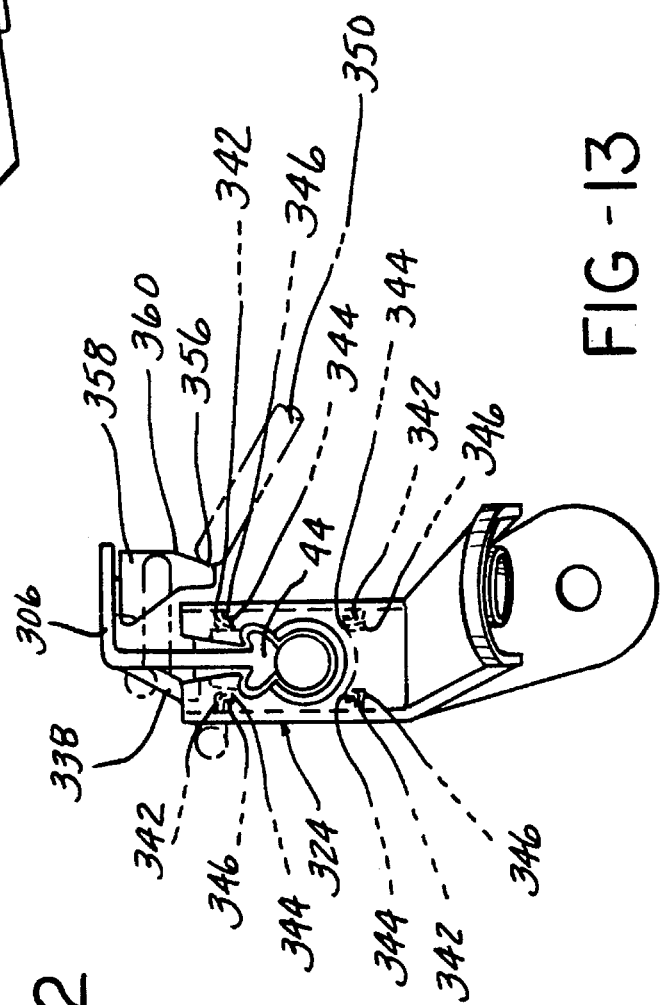
FIG-12
FIG-13

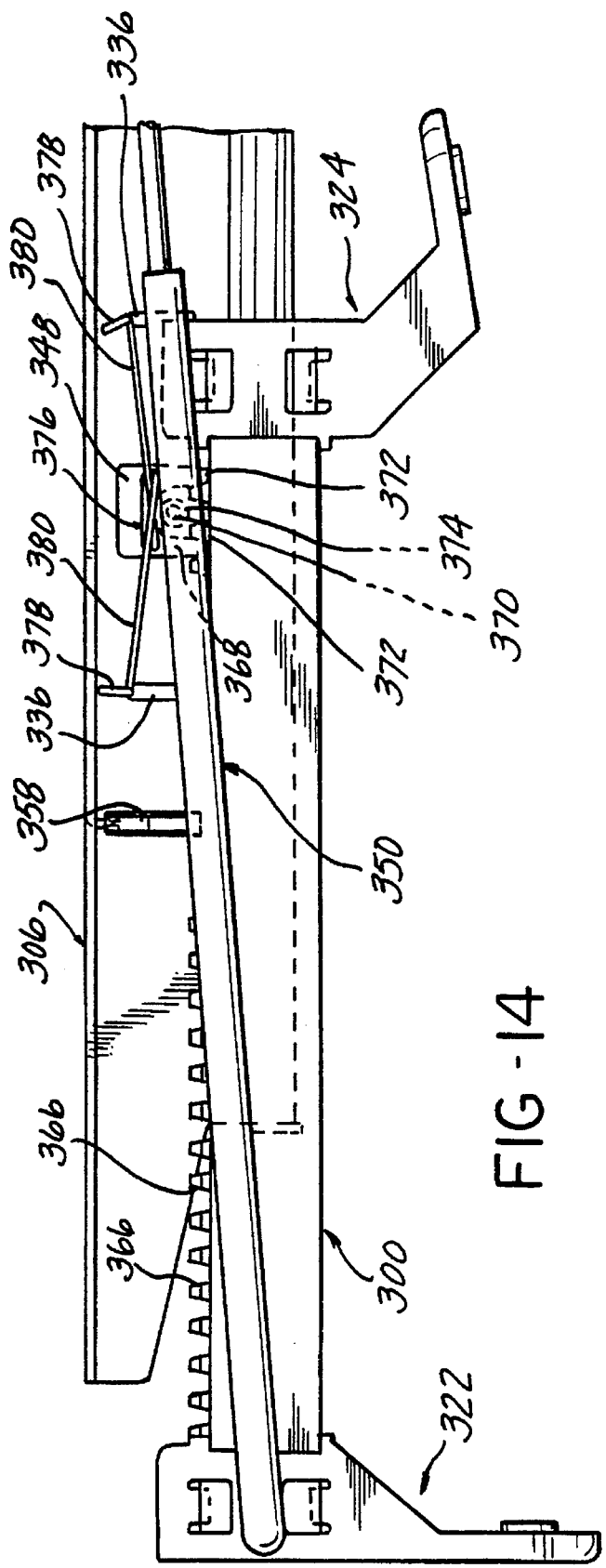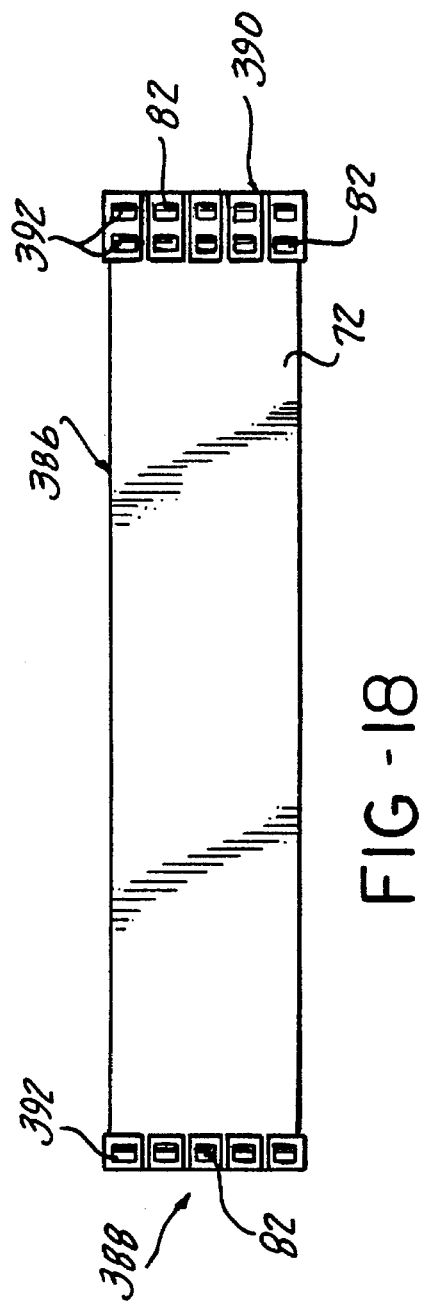

MANUAL SEAT ADJUSTER

RELATED APPLICATIONS

This application is a continuation-in-part of application Ser. No. 08/040,478, filed on Mar. 31, 1993, now U.S. Pat. No. 5,344,114, wherein both applications were subject to assignment to ITT Corporation at the time the inventions were invented.

BACKGROUND OF THE INVENTION

1. Field of the Invention

The present invention relates, in general, to seats, and more specifically, to adjusters for vehicle seats.

Seat adjusters are used on the front seats of automotive vehicles to provide selective horizontal fore and aft movement of the seat to accommodate occupants, particularly drivers, of different size and height as well as to provide a comfortable seating position to suit each driver's preference. Such seat adjusters typically include a support frame which is connected to and supports a seat bottom and/or a seat back of a vehicle seat. A pair of spaced upper tracks are connected to the support frame and are each, in turn, slidably mounted in one of a pair of lower tracks which are anchored to the vehicle floor. A releasable lock mechanism is employed with such seat adjusters to lock the upper track, the support frame and the seat in any desired horizontal fore and aft position. The adjustable lock mechanism must provide a structure that ensures complete locking of the seat even when the seat is between predetermined horizontal fore and aft positions. Misalignment of the lower tracks and variances in tolerances may cause one upper track of the seat adjuster to lock while the other upper track is between predetermined horizontal fore and aft positions. The adjustable lock mechanism must ensure that the other upper track will lock upon minimal sliding of the seat in the horizontal fore and aft direction. Therefore, it would be desirable to provide a low inertia lock mechanism that quickly locks the upper track upon horizontal fore and aft movement of the seat when the lock mechanism is between predetermined horizontal fore and aft positions.

The lock mechanism must be strong enough to hold the upper tracks and seat in a fixed horizontal position under loads acting on the seat during a collision to prevent injury to the occupant. Thus, the weight and size of the seat adjuster components are selected to provide a maximum amount of strength to resist any movement of the seat adjuster and the seat and to securely anchor the seat adjuster to the floor under high impact forces transmitted to the seat from the occupant during a vehicle collision. Thus, the individual tracks, the seat support frame and the track anchors are made of stronger materials and in greater thicknesses and dimensions to provide the requisite amount of strength. Although this adds cost and weight to the seat, such efforts are considered essential to provide adequate strength to a seat to resist movement during a vehicle collision.

A recent trend in vehicle seat design is to incorporate the seat as part of the occupant protection or safety system. Test results embodied in Federal Motor Vehicle Safety Standards 208 and 210 require that seat belts and their anchorages withstand loads of 1500 to 3000 pounds without failure. If any seat belt anchor is mounted to the seat structure, the seat structure must also withstand such loads as well. The outboard (adjacent the door) upper, shoulder seat belt and lower, lap seat belt and their anchors should withstand a load of 1500 pounds and the inboard (adjacent the vehicle centerline) lap seat belt point should withstand a load of 3000 pounds.

However, despite the added load the seat belts transfer to a vehicle seat frame, it is still desirable to mount the seat belt buckle assembly directly to the seat track assembly since adjustment of the seat by an occupant would not require readjustment of the seat belt. Further, integration of the seat belt buckle mounting to the seat track assembly enables the seat belt and seat belt buckle assembly to be designed as a unitary structure so as to simplify vehicle floor pan construction and installation at the vehicle assembly plant.

At the same time, increased emphasis on fuel economy and the imposition of higher federally mandated fuel economy standards necessitate vehicle weight reduction. This makes it desirable to reduce the weight of the vehicle seat, but such weight reduction is directly opposed to the high strength requirements noted above.

Also, increased competition has led to the need to reduce cost and increase efficiency in both parts and labor. Therefore, it is desirable to design a vehicle seat adjuster that reduces the number of parts to the assembly while reducing the amount of labor required to assemble these parts.

Thus, it would be desirable to provide a vehicle seat adjuster with a low inertia lock mechanism that, when between predetermined horizontal fore and aft positions will quickly engage to lock the vehicle seat adjuster upon horizontal fore and aft movement of the seat. It would be desirable to provide a vehicle seat adjuster which meets the need for high strength to prevent seat and seat belt buckle anchorage movements or track separation under collision impact loads. Furthermore, it would be desirable to provide a vehicle seat adjuster which allows easy fore and aft adjustment, and, at the same time, minimizing weight and manufacturing cost. In addition, it would be desirable to provide a vehicle seat adjuster that provides a minimum amount of assembled parts and fasteners in order to reduce labor and material costs.

SUMMARY OF THE INVENTION

The present invention is an adjuster for a vehicle seat which provides easy horizontal fore and aft movement of the seat relative to the vehicle floor, minimal seat weight and manufacturing costs and, at the same time, high strength to resist separation of the seat adjuster components and movement of the seat during impact loads acting on a seat during a vehicle collision. The present invention also provides a low inertia locking mechanism for a vehicle seat adjuster that, when between predetermined horizontal fore and aft positions, will quickly engage to lock the vehicle seat adjuster upon horizontal fore and aft movement of the seat.

In one embodiment, the seat adjuster comprises first and second track assemblies. Each of the track assemblies includes a lower track having a bore extending longitudinally therethrough. A longitudinally extending slot is formed in each lower track and opens to the bore. An upper track is slidably mounted in the bore in each lower track. A support arm is connected to the upper track and slidably extends outward through the slot in the lower track. Bearing means are disposed in the bore in the lower track between the upper track and the lower track for slidingly engaging the upper track with the lower track. Support means are connected to the lower track for mounting the lower track in a stationary position on the vehicle floor.

Cooperating resisting means are formed in the upper and lower tracks for resisting separation of the upper track from the lower track in a direction substantially perpendicular to the longitudinal axis of the bore in the lower track. Finally, locking means are provided for releasably locking the upper track against movement relative to the lower track. The locking means includes a generally U-shaped rod having two legs joined by a central bight portion. One end of each leg of the rod is pivotally connected to one of the seat support arms, with the two legs extending forwardly to the bight portion located between the first and second track assemblies.

Preferably, the upper and lower tracks are formed of extruded aluminum for reduced weight. The cooperating resisting means preferably comprises at least one notch formed in and extending longitudinally along one of the upper and lower tracks. A longitudinally extending flange is formed on the other of the upper and lower tracks. The flange extends outwardly from the other of the upper and lower tracks into sliding engagement with the notch in the one track and engages the notch under deformation forces acting to move one end of the upper track out of the slot in the lower track.

In a preferred embodiment, a pair of notches are spacedly formed on and extend longitudinally along the lower track. A pair of spaced flanges are formed on and extend longitudinally along the upper track and are each disposed in a nominally spaced position within each notch in the lower track.

In an exemplary embodiment, a lower portion of the upper track has a plurality of angularly disposed exterior faces. The bearing means includes a cage having a plurality of spaced rows of apertures formed therein. A roller formed of a high compression resistant plastic is slidably disposed in each aperture in the cage and engages an adjacent angular exterior face of the upper track and an opposed inner surface of the lower track when the cage is formed around and to the shape of the upper track. The apertures in the cage are arranged to be disposed adjacent one of the exterior faces of the upper track for mounting a roller in contact with a face of the upper track. The rows of apertures and rollers in the cage are spaced apart at any predetermined spacing dependent upon expected force loads.

The locking means preferably comprises catch means formed on each lower track. A notch is formed in the support arm connected to the upper track. Each rod leg has a latch portion that engages the catch means in the lower track and the notch in the seat support arm connected to the upper track. The latch portion may be integral with or connected to each rod leg, and the latch portion may have a single locking member or a plurality of locking members. Upon pivoting the rod about the ends of the legs between a first position and a second, opposite position, the latch portion of the rod alternately engages and disengages the catch means. Preferably, the catch means comprises a plurality of spaced, collinearly arranged, open-ended notches formed in flanges extending outward from the lower track.

In another embodiment, a low inertia locking means is provided wherein a lightweight rod extends from each rod leg. A locking member extends over the lightweight rod and engages the catch means in the lower track. A spring biases the locking member toward the catch means, and the lightweight rod cooperatively engages the locking member when the rod is lifted toward the second position. When the rod is released, the lightweight rod and rod legs fall independently of the spring, and the spring urges the locking member downward, into engagement with the catch means. If the locking member rests between predetermined horizontal fore and aft positions, the spring will bias the locking member into engagement with the catch means upon horizontal fore and aft movement of the seat with no resistance from the lightweight rod.

The support means preferably comprises first and second support members associated with opposite ends of each lower track. Each of the first and second support members includes a base mounting portion and a lower track connecting portion. The lower track connecting portion of each of the first and second support members is connected to opposite ends of a lower track. An aperture is formed in the lower track connecting portion of each of the first and second support members and is sized to permit the upper track to slidably pass therethrough. At the same time, the lower track connecting portion of each of the support members prevents the bearing means from sliding out of the lower track.

The support means is provided in various configurations including metallic support members which are attached opposite ends of each lower track by means of threaded fasteners. In another embodiment, the metallic support members are riveted to opposite ends of each lower track. In yet another embodiment, the support members are formed of a high strength plastic and are connected to opposite ends of each lower track by means of threaded fasteners or by adhesive. In even another embodiment, the support means provide integral tabs that engage ribs on the lower track that extend longitudinally along the top and bottom of the lower track.

Finally, stop means are provided on the seat support arm of each upper track and engage the lower track connecting portion of the lower track support members for establishing maximum travel positions of the upper track in horizontal fore and aft directions.

The vehicle seat adjuster of the present invention meets the design criteria of current vehicle seats by providing a seat adjuster having reduced weight and lower manufacturing costs, while at the same time, providing the high requisite strength to maintain the seat in a stationary position under impact loads acting on the seat, as well as to prevent separation of the upper and lower tracks of the seat adjuster during such loads. The seat adjuster of the present invention provides the high strength required for integral seat belt buckle anchorage directly to the seat adjuster. This enables the entire vehicle seat, seat adjuster and seat belt buckle assembly to be integrated into a single unit for ease of manufacturing, shipping and installation. The vehicle seat adjuster of the present invention also includes various lower track support members to suit many different mounting configurations and, in one embodiment uniquely enables high strength plastic to be employed as a track support which further reduces the weight of the seat adjuster. In another embodiment, integral tabs are utilized on the lower track support members to engage integral ribs on the lower track in order to eliminate all conventional fasteners.

BRIEF DESCRIPTION OF THE DRAWINGS

The various features, advantages and other uses of the present invention will become more apparent by referring to the following detailed description and drawings in which:

FIG. 1 is a side-elevational view of a seat adjuster of the present invention, with the upper track shown in a rearward position;

FIG. 3 is a cross-sectional view, generally taken through the joined upper and lower tracks of one of the track assemblies of the seat adjuster shown in FIGS. 1 and 2;

FIG. 4 is a plan view of the bearing means shown in a preassembly, flattened condition;

FIG. 5 is a cross-sectional view generally taken along line 5—5 in FIG. 4 and showing the roller mounting in the bearing means;

FIG. 9 is an exploded, side-elevational view of a third embodiment of the lower track and lower track support means;

FIG. 10 is an exploded, side-elevational view of a fourth embodiment of the lower track and lower track support means;

FIG. 12 is a side-elevational view of the seat adjuster showing the fifth embodiment of the lower track and lower track support means and the second embodiment of the support arm and locking means;

FIG. 13 is an end view of the fifth embodiment of the lower track support means and the lower track and the second embodiment of the support arm and locking means as seen in FIG. 12;

FIG. 14 is a side-elevational view of the seat adjuster showing the fifth embodiment of the lower track and lower track support means and showing the second embodiment of the support arm and the third embodiment of the locking means;

FIG. 18 is a plan view of the second embodiment of the bearing means shown in a preassembled, flattened condition.

DESCRIPTION OF THE PREFERRED EMBODIMENTS

Figure 2:
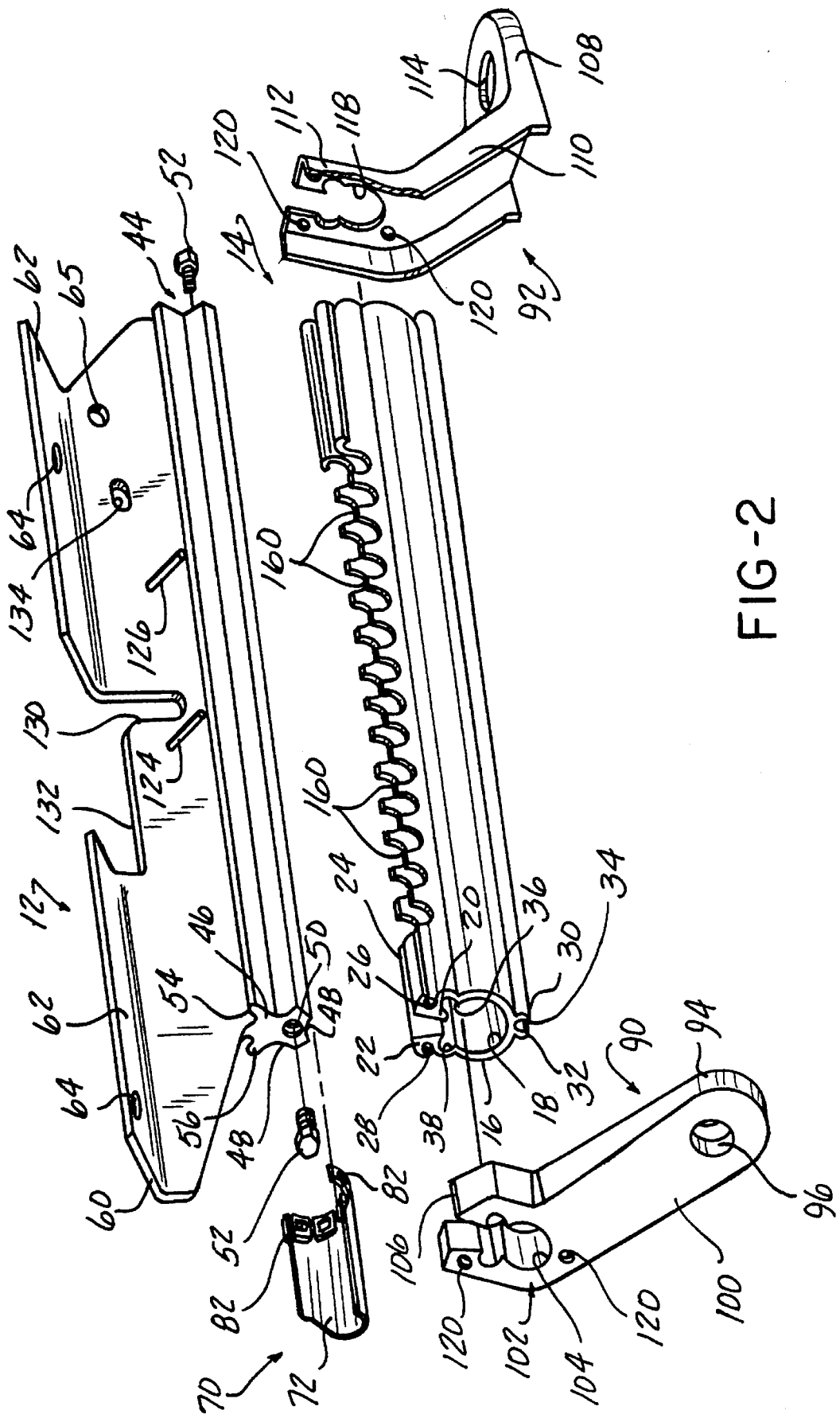
FIG. 2 is an exploded, perspective view of a portion of the seat adjuster shown in FIG. 1.

Referring now to the drawing, and to FIG. 1 in particular, there is depicted a seat adjuster 10 for use in an automotive vehicle to adjustably position a conventional vehicle seat to a vehicle floor and to provide selective horizontal fore and aft positioning of the seat as desired by the occupant. The seat adjuster 10 is preferably a manual seat adjuster; although it will be understood that the teachings of the present invention are equally applicable to power seat adjusters utilizing drive motors to adjust the position of the seat as desired.

As is conventional, the seat adjuster 10 includes first and second track assemblies 12, with only one of the track assemblies 12 being depicted in FIGS. 1 and 2. The first and second track assemblies 12 are substantially identical to each other, but include symmetrically opposite portions for mounting on opposite lateral edges of a vehicle seat. Each of the track assemblies, such as track assembly 12, is designed to be connected to and support a vehicle seat, not shown, by means of fasteners which connect to a seat frame forming a part of the seat bottom of a vehicle seat.

Due to the symmetrical nature of the first and second track assemblies, the following description will be provided only for the first track assembly 12. It will be understood that the opposed second track assembly is substantially identically constructed.

As shown in FIGS. 1 and 2, in one embodiment, first track assembly 12 includes a lower track 14 which is preferably formed of a lightweight, metallic material, such as aluminum or magnesium. Preferably, the lower track 14 is extruded to the depicted shape. The lower track 14 includes a substantially circular bottom portion 16 which has a bore 18 formed therein and extending longitudinally along the lower track 14. A pair of spaced flanges 20 and 22 extend outward from the bottom portion 16 and are spaced apart to form an elongated slot 24 which also extends longitudinally along the length of the lower track 14. The slot 24 opens to the central bore 18 formed in the bottom portion 16 of the lower track 14. The outer ends of the flanges 20 and 22 are curved over in an arcuate shape and define bores 26 and 28, respectively, in conjunction with the adjacent portion of the flanges 20 and 22. The bores 26 and 28 are threaded to provide attachment of lower track support means, as described hereafter.

A pair of short length, depending flanges 30 and 32 extend below the bottom portion 16 of the lower track 14. The flanges 30 and 32 are arcuate in shape and define a circular bore 34 therebetween which is threaded for receiving fasteners to attach to the lower track support means to the lower track 14. Finally, a pair of internally disposed notches 36 and 38 are formed in the lower track 14 in communication with the central bore 18. The function of the notches 36 and 38 will be described in greater detail hereafter.

The first track assembly 12 also includes a first embodiment of the upper track denoted generally by reference number 44. The upper track 44 includes a bottom portion 46 which is slidably disposed within the bore 18 in the lower track 14. The upper track 44 is also preferably formed of a lightweight metallic material such as aluminum or magnesium. The upper track 44 may be extruded to the illustrated shape. Although the bottom portion 46 of the upper track 44 may have any shape, such as circular, square, etc., in a preferred embodiment, the bottom portion 46 is formed with a plurality of angularly disposed, arcuate shaped faces, each denoted by reference number 48. Five arcuate faces 48 are formed in the bottom portion 46 and form separate exterior faces on the upper track 44 which are spaced from the inner surface of the bottom portion 16 of the lower track 14 when the upper track 44 is slidably mounted in the bore 18 in the lower track 14. A threaded bore 50 is formed in each end of the bottom portion 46 of the upper track 44 and receives a fastener 52 having an enlarged head.

A pair of outwardly extending, spaced flanges 54 and 56 are formed in the upper track 44 immediately adjacent the bottom portion 46. The flanges 54 and 56 are slidably disposed within the notches 36 and 38, respectively, in the lower track 14. Upon deformation loads imposed on one end of the first track assembly 12, such as during a vehicle collision, one or both of the flanges 54 and 56 will be brought into engagement with the corresponding notch 36 and 38 in the lower track 14 and forcibly engage the lower track 14 to resist separation of the upper track 44 from the lower track 14.

A first embodiment of the seat support arm 60 is connected to and extends outward from the bottom portion 46 of the upper track 44. The seat support arm 60 has inwardly angled upper flanges 62, each having an aperture or slot 64 formed therein for receiving suitable fasteners to mount a vehicle seat and, in particular, the seat support frame, not shown, to the seat support arm 60.

As shown in FIGS. 2 and 3, when the upper track 44 is mounted in the lower track 14, the seat support arm 60 slidably extends through the slot 24 in the lower track 14 and extends outward from the lower track 14. Preferably, the seat support arm 60 and upper flanges 62 are integrally formed as an extrusion with the bottom portion 46 and the flanges 54 and 56 of the upper track 44. A seat belt mounting aperture 65 is formed in the seat support arm 60 to integrally attach a seat belt to the seat support arm 60.

A bearing means 70, shown in FIGS. 3, 4 and 5, is mounted between the inner surface of the lower track 14 and the angular faces 48 on the bottom portion 46 of the upper track 44. The bearing means 70 slidably engages the lower track 14 and the upper track 44 and provides easy sliding movement of the upper track 44 within the lower track 14. The bearing means 70 includes a cage 72 which, prior to assembly, has a generally planar shape as shown in FIG. 4. The cage 72 is formed of a suitable, high strength material, such as plastic and, in particular, NYLON. A plurality of apertures 74 arranged in spaced rows are formed in the cage 72. The spacing between the rows of apertures 74 and the number of apertures 74 in each row is selected depending upon the expected force loads to be imposed on the track assembly 12. Thus, although three rows 76, 78 and 80, each containing five apertures 74, are shown at equal spaced intervals in FIG. 4, a different number of rows as well as a different spacing between adjacent rows and a different number of apertures 74 in each row may also be provided.

A roller 82 having a generally cylindrical shape is rollably disposed within each aperture 74 in the cage 72, preferably by a snap-in-fit. The roller 82 is also formed of a suitable material, with a carbon fiber reinforced polyphthalamide being employed in an exemplary embodiment. The cage 72 is formed with enlarged portions surrounding each aperture 74 to provide a suitable mount for each roller 82. It will also be understood that the bearing means may take other forms, such as the ball bearings mounted in a slidable casing as shown in Applicant's U.S. Pat. No. 4,981,278.

The use of a plastic material to form each roller 82, which, in a preferred embodiment, is a plastic having high compressibility and high creep resistance affords advantages over metal rollers and balls. Since the plastic rollers 82 are capable of a certain amount of compression, loads imposed on the seat will cause compression of the rollers 82 without forcing the rollers 82 into the surface of the tracks 14 and 44 which, in prior art seat adjuster track construction has resulted in notches or grooves being formed in such tracks which provide audible noise during movement of the track and/or a non-smooth adjustment movement of the vehicle seat. Since the plastic rollers 82 are capable of absorbing high amounts of load, the tracks themselves can be formed of a lightweight material, such as aluminum or magnesium, without concern for the formation of notches or grooves in such tracks caused by high forces or loads acting on the tracks and bearings.

As shown in FIGS. 2 and 3, after the rollers 82 have been mounted in each of the apertures 74 in the cage 72, the cage 72 is then bent around the bottom portion 46 of the upper track 44 to bring one roller 82 in each of the rows 76, 78 and 80 into engagement with one arcuate face 48 in the bottom portion 46 of the upper track 44. Adjacent rollers 82 in each row 76, 78 and 80 are disposed in rolling contact with adjacent faces 48 on the upper track 44. As shown in FIG. 3, each of the rollers 82 rollably engages one of the arcuate faces 48 in the upper track 44 and the inner side wall of the bottom portion 16 of the lower track 14.

The cage 72 has a length shorter than the overall length of the lower track 14. During sliding movement of the upper track 44 in the lower track 14, as described hereafter, the cage 72 slides within the lower track 14, but for only approximately one-half of the distance of movement of the upper track 44. The cage 72 is retained within the lower track 14 by means of the support means as used to anchor the lower track 14 to the vehicle floor, as described hereafter. In addition, the enlarged heads on the fasteners 52, mounted at opposite ends of the first embodiment of the upper track 44, retain the cage 72 on the upper track 44 when one end of the upper track 44 is completely disposed within the lower track 14.

Figure 7:
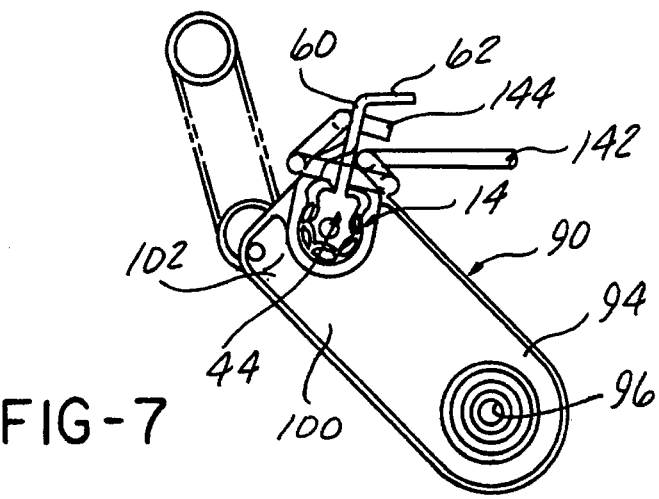
FIG. 7 is a front-elevational view of one of the track assemblies of the seat adjuster shown in FIG. 1.

As shown in FIGS. 1 and 2, the first track assembly 12 includes support means for securely supporting and anchoring the lower track 14 to a vehicle floor. The support means preferably comprises first and second support members 90 and 92 which are connected to opposite ends of the lower track 14. Each support member 90 and 92 generally includes a floor mounting portion, a lower track connecting portion and an arm portion extending between the floor mounting portion and the lower track mounting portion. For the support member 90, shown in FIGS. 1, 2 and 7 which is connected to one end of the lower track 14, the first support member 90 is formed of a single piece metallic body, i.e. steel, by having a floor mounting portion 94 with an aperture 96 formed therein adapted to receive a suitable fastener 98 for attachment to the vehicle floor, an intermediate arm portion 100 and a lower track connecting portion 102. The intermediate arm portion 100 is disposed at an angle between the floor mounting portion 94 and the lower track connecting portion 102, as shown in FIGS. 2 and 7.

The lower track mounting portion 102 includes an aperture 104 which is smaller than the central bore 18, but has the same size and shape notches as the notches 36 and 38 in the lower track 14. A slot 106 extends through the upper end of the lower track connecting portion 102 into communication with the aperture 104 and is alignable with the slot 24 in the lower track 14. The slot 106 and the aperture 104 enable the upper track 44 to slide out of the one end of the lower track 14 through the first support member 90 during forward movement of the upper track 44 with respect to the lower track 14.

It should be noted that the support member 90, shown in FIG. 2, is particularly devised for mounting on the inboard side (adjacent the vehicle centerline) of the vehicle seat on which the seat adjuster 10 of the present invention is mounted. The corresponding outer support member for the adjacent track has a generally similar configuration, but with a slightly different angle between the floor mounting portion 94 and the lower track connecting portion 102.

The second or rear support member 92 also includes a floor mounting portion 108, an intermediate arm portion 110 and a lower track connecting portion 112. A bore 114 is formed in the floor mounting portion 108 to receive a suitable fastener 116 therethrough for connecting and securely anchoring the support member 92 to the vehicle floor. The intermediate portion 110 of the support member 92 extends outwardly and upwardly from the floor mounting portion 108 to dispose the lower track connecting portion 112 adjacent one end of the lower track 14. An aperture 118 is formed adjacent the upper end of the support member 92 that is smaller than the central bore 18, but has the same size and shape as the notches 36 and 38 and the slot 24 in the lower track 14 to enable the upper track 44 to slide outward from the lower track 14 through the aperture 118 when the upper track 44 is moved rearward with respect to the lower track 14.

In this embodiment of the support means, both support members 90 and 92 are formed of a high strength metal, such as steel. Bores 120 are formed in the lower track connecting portions 102 and 112 of the support members 90 and 92, respectively, and receive suitable fasteners, such as threaded screws, which extend through the bores 120 into mating bores 26, 28 and 34 formed in the ends of the lower track 14. In this manner, the support members 90 and 92 are securely connected to the lower track 14 at opposite ends of the lower track 14. Although the upper track 44 can pass through the support members 90 and 92 during horizontal fore and aft movement, the bearing means 70 disposed within the lower track 14 is held captive within the lower track 14 by means of abutment with the support members 90 and 92 which prevent the bearing means 70 from sliding out of the lower track 14.

Stop means in the form of a pair of spaced pins 124 and 126, FIG. 2, are mounted on the seat support arm 60 and extend laterally outward therefrom. The pins 124 and 126 are welded or press fit into apertures in the seat support arm 60 and act as stops to limit forward and rearward movement, respectively, of the upper track 44 when the pins 124 and 126 engage the support members 90 and 92.

Figure 6:
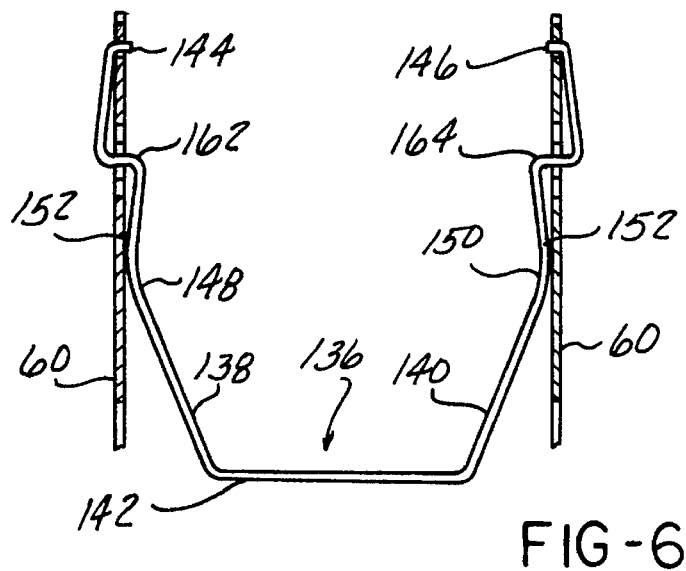
FIG. 6 is a plan view of the handle forming a part of the lock means of the seat adjuster of the present invention.

The seat adjuster 10 is also provided with releasable locking means for releasably locking the upper track 44 against movement with respect to the lower track 14. As shown in FIGS. 1 and 2, the releasable lock means includes a notch 130 formed in a centrally located cut-out 132 in the seat support arm 60 connected to the upper track 44. The notch 130 extends substantially vertically in the normal mounting position of the seat adjuster 10 on a vehicle floor. An aperture or slot 134 is also formed in one end of the seat support arm 60 as shown in FIG. 2. A corresponding aperture 134 is formed in the seat support arm of the opposite seat track assembly. As shown in FIGS. 6 and 7, a handle 136 generally in the form of a U-shaped rod is provided with two opposed legs 138 and 140 which are connected at one end by a central bight portion 142. The opposite ends 144 and 146 of the legs 138 and 140, respectively, of the handle or rod 136 are pivotally mounted in the apertures 134 in the seat support arms 60 of the first and second track assemblies. This enables the handle 136 to exhibit pivotal movement about the ends 144 and 146 from a first position, in which a portion of the handle 136 engages a latch means to lock the upper track 44 in a fixed position relative to the lower track 14, and an opposite or second position, in which the handle 136 is disengaged from the latch means and enables free sliding movement of the upper track 44 relative to the lower track 14.

Each leg 138 and 140 of the handle 136 includes a cam portion 148 and 150, respectively, which engages an inner camming surface on the seat support arm 60. A low friction bearing 152 is mounted on the inner surface of each seat support arm 60 to provide free sliding movement of the cams 148 and 150 during pivotal movement of the handle 136, as described above. By reason of the outward diversion of the legs 138 and 140, the cam portions 148 and 150 act to stress the handle 136 during upward pivotal movement of the handle 136. The inherent resiliency of the handle or rod 136 resists such compression and serves to urge the handle 136 by reason of the cam portions 148 and 150 engaging the camming surfaces on the seat support arms 60 in an opposite or second direction, i.e., downwardly. This urges the rod 136 downwardly into a locked position at all times except when the occupant grasps and pivots the rod 136 upward to adjust the horizontal fore and aft position of the seat.

As shown in FIGS. 1 and 2, a plurality of catches 160 are formed in the lower track 14 as part of the latch means. Preferably, a plurality of collinear, spaced catches 160, each in the form of an open-ended notch are formed in aligned pairs in the upstanding flanges 20 and 22 on the lower track 14. The handle 136 includes an outward extending latch portion 162 and 164 on each leg 138 and 140, respectively, which passes through the notch 130 in the seat support arm 60 of each track assembly 12 and into one of the selected catches 160 to lock the upper track 14 and the seat attached thereto in a fixed, stationary position relative to the lower track 14. Upward pivotal movement of the bight portion 142 of the rod 136 releases the latch portions 162 and 164 on the legs 138 and 140 from one aligned pair of catches 160 in the lower track 14 to enable the position of the upper track 44 to be adjusted horizontally either fore or aft with respect to the lower track. Release of the bight portion 142 of the handle 136, due to the normal downward biasing of the handle 136 through the cams 148 and 150, will bring the latch portions 162 and 164 on the rod 136 into engagement with another aligned pair of catches 160 to again stationarily lock the upper track 44 in a fixed position relative to the lower track 14.

Figure 8:
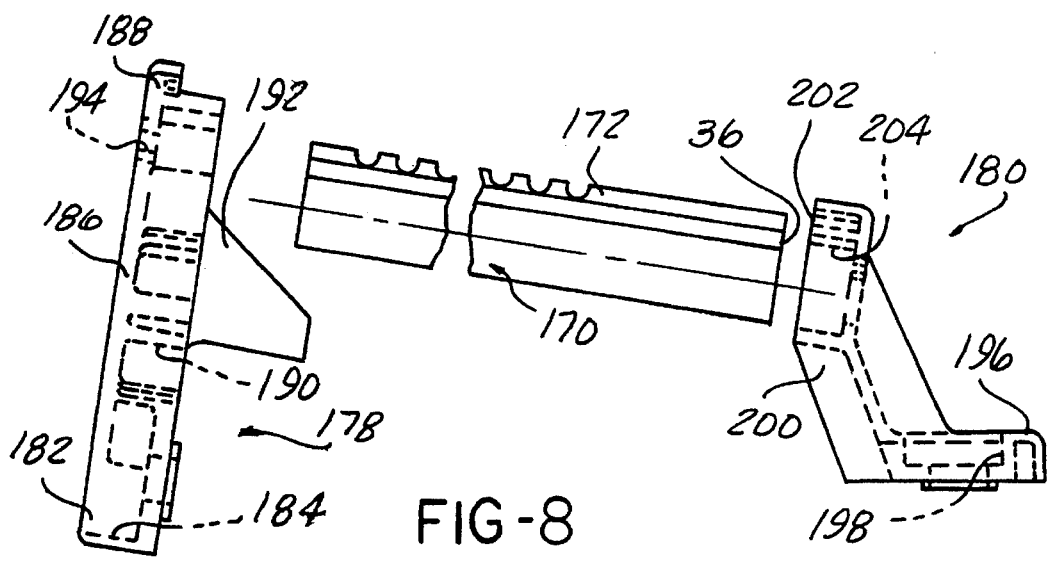
FIG. 8 is an exploded, side-elevational view of a second embodiment of the lower track and lower track support means.

Referring now to FIG. 8, there is depicted another embodiment of the lower track support means used to stationarily anchor a lower track 170 of the track assemblies 12 to the vehicle floor. In this embodiment, the lower track 170 has a somewhat different configuration than the lower track 14 described above and shown in FIG. 2. In this embodiment, the lower track 170 still includes a central aperture 18 and spaced notches 36 and 38. Further, a pair of upstanding flanges 172 extend upward from the notches 36 and 38 and form a slot therebetween for slidingly receiving the seat support arm 60 therethrough in the same manner as described above in the first embodiment of the lower track 14.

In this embodiment, the support means comprises first and second support members 178 and 180 which are connected to opposite ends of the lower track 170. The front-most support member 178 is formed of a plastic material reinforced by long glass fibers. The support member 178 includes a vehicle floor mounting portion 182 having a bore 184 extending therethrough for receiving a suitable fastener to attach the support member 178 to the vehicle floor. A central arm portion 186 extends from the floor mounting portion 182 to a lower track connecting portion 188. A series of webs 190 are formed within the support member 178 for strength as well as to reduce the overall weight of the support member 178. A rib 190 also extends rearward of the intermediate arm portion 186 and is adapted to rest on a portion of the vehicle floor. An aperture 194 is formed in the lower track mounting portion 188 and communicates with the bore 18 and the notches 36 and 38 in the lower track 170 to slidingly receive the upper track 44 therethrough while blocking escape of the bearing means 70 from between the upper and lower tracks 44 and 170. The lower track connecting portion 188 of the support member 178 is securely attached to one end of the lower track 170 by means of a suitable adhesive.

Similarly, the corresponding support member 180 has a vehicle floor mounting portion 196 with an aperture 198 formed therein for receiving a suitable fastener therethrough. An intermediate arm portion 200 extends from the floor mounting portion 196 to a lower track connecting portion 202. An aperture 204 is formed in the lower track connecting portion 202 and communicates with the bore 18 and the notches 36 and 38 in the lower track 170 to slidingly receive the upper track 44 therethrough while blocking escape of the bearing means 70 from between the upper and lower tracks 44 and 170. The support 180 is likewise securely attached to one end of the lower track 170 by means of an adhesive.

The support members for the opposite track assembly are generally similar to the support members 178 and 180, except for minor variations in shape between floor mounting portions and the lower track connecting portion.

Another embodiment of the support means of the present invention is shown in FIG. 9. In this embodiment, support members 210 and 212 are likewise formed of a high strength engineering plastic material and has substantially the same shape as the support members 178 and 180 described above and shown in FIG. 8. However, in this embodiment, the lower track connecting portions of the support members 210 and 212 are provided with a plurality of apertures 214 which are alignable with the threaded bores 26, 28 and 34 in the lower track 170. The apertures 214 and bores 26, 28 and 34 receive threaded fasteners 216, such as screws, for securely connecting the support members 210 and 212 to opposite ends of the lower track 170.

Another embodiment of the support means is shown in FIG. 10. In this embodiment, support members 220 and 222 and lower track 224 are formed of metal. The support members 220 and 222 are securely connected to opposite ends of the lower track 224 by means of rivets 225. The lower track 224 is similar to lower track 14 but includes a depending flange 226. The flange 226 nests against thin sections 228 and 230 in the support members 220 and 222 and is secured thereto by rivets 225 which are mounted on apertures in the nested sections or are self-piercing directly through the nested sections.

Finally, as shown in FIG. 1, a biasing spring 234 may be optionally connected between the seat frame at one end and one of the lower track supports, such as support member 90, at another end to provide a biasing force to assist in moving the seat in a forward direction.

Figure 11:
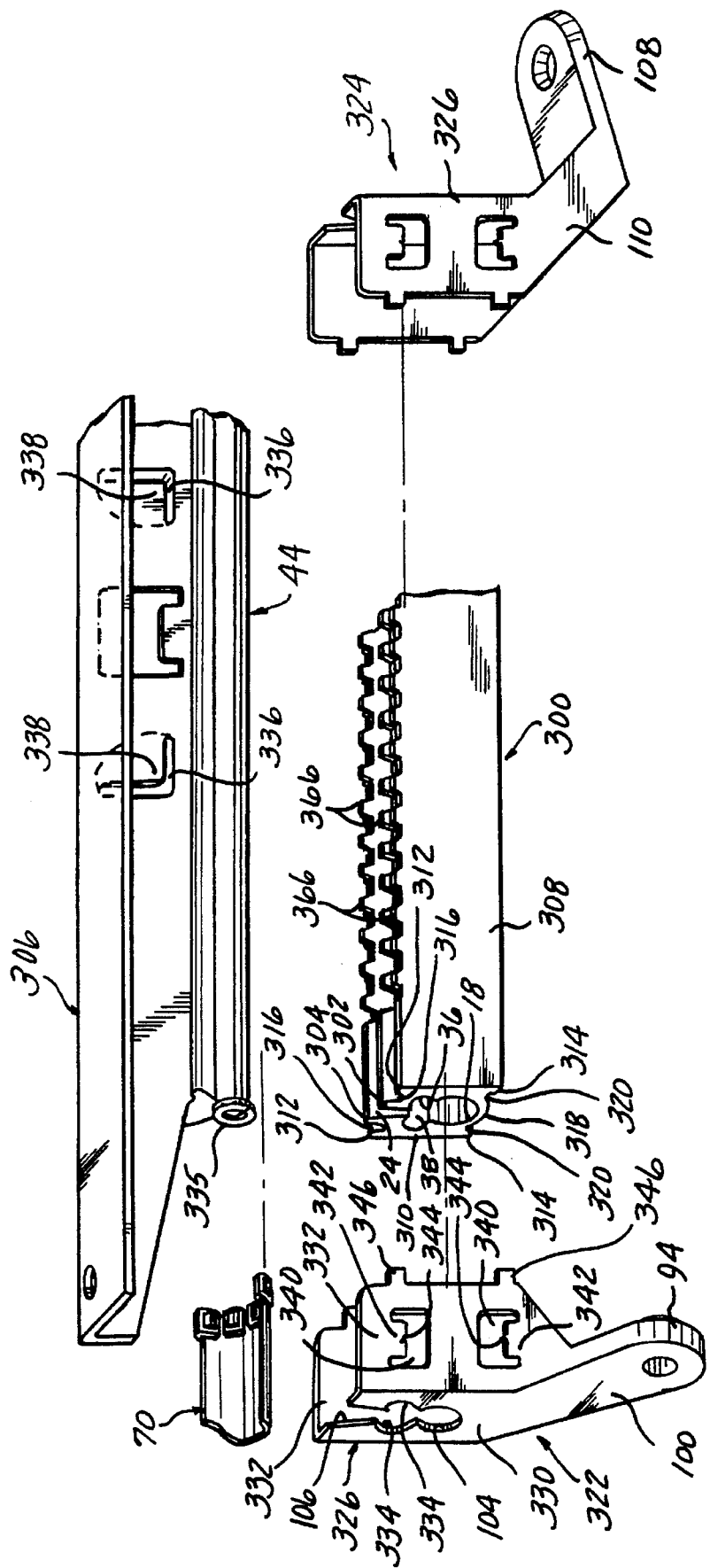
FIG. 11 is an exploded, perspective view of a fifth embodiment of the lower track and lower track support means and a second embodiment of the support arm.

In order to eliminate conventional fasteners within the seat adjuster 10, an additional embodiment of the support means and the lower track of the present invention is provided, as seen in FIG. 11. In this embodiment, a lower track 300 is provided with a somewhat different configuration than provided in the previous embodiments. The lower track 300 is fabricated from a lightweight, metallic material, such as magnesium or aluminum, and is extruded to a substantially rectangular cross section. The lower track 300 still includes the central bore 18 extending longitudinally along the lower track 300 and the pair of internally disposed notches 36, 38 formed in the lower track 300 in communication with the bore 18, as previously described and shown in FIG. 2. Furthermore, a pair of upstanding flanges 302, 304 extend upward from the pair of internally disposed notches 36, 38 and are spaced to form the elongated slot 24 therebetween which also extends longitudinally along the length of the lower track 300. The slot 24 opens to the bore 18 formed in the lower track 300 for slidably receiving a seat support arm 306 therethrough in the same manner previously described and shown in FIG. 3.

In this embodiment, the lower track 300 has a pair of vertical side walls 308, 310 that are substantially straight and parallel forming ribs 312 and 314 which extend longitudinally along the length of the lower track 300. A recess 316 is provided between the upstanding flanges 302, 304 and the top corners of the side walls 308, 310 of the lower track 300 to define the top ribs 312. The bottom of the lower track 300 has a convex arcuate surface 318 that extends between the side walls 308, 310 and merges with the side walls 308, 310 at a point above the bottom of the side walls 308, 310. A groove or recess 320 is formed between the bottom arcuate surface 318 and bottom of the side walls 308, 310 to form and define the bottom ribs 314 of the lower track 300.

The support means comprises first and second support members 322, 324, respectively, which are connected to opposite ends of the lower track 300 for supporting and anchoring the lower track 300 to the vehicle floor. Each of the support members 322, 324 is fabricated from a single piece metallic body, such as steel. The support members 322, 324 include the floor mounting portion 94, 108, respectively, a lower track connecting portion 326 and the intermediate arm portion 100, 110, respectively, extending between the floor mounting portion 94, 108 and the lower track connecting portion 326. The floor mounting portion 94, 108 and the intermediate arm portion 100, 110 of each support member 322, 324 is similar to that previously described and shown in FIG. 1, but the lower track mounting portion 326 of the support members 322, 324 that fixedly connects the lower track 300 to the support members 322, 324 is rather different.

Each of the support members 322, 324 have similar lower track connecting portions 326, and therefore, they will be commonly described. The lower track connecting portion 326 of the support members 322, 324 is substantially U-shaped in that the lower track connecting portion 326 has an end wall 330 with two side walls 332 integral with and extending substantially perpendicularly from the end wall 330 toward the lower track 300. The two side walls 332 are substantially parallel to one another and are substantially similar. Like the support members 90, 92 previously described and shown in FIG. 1, the aperture 104 formed in the end wall 330 of the lower track connecting portion 326 of the support members 322, 324 is smaller than the bore 18 in the lower track 300, but the notches 334 in the end wall 330 are the same size and shape as the notches 36, 38 in the lower track 300. The slot 106 extends through the upper end of the lower track connecting portion 326 into communication with the aperture 104 and is aligned with the slot 24 in the lower track 300. The slot 106 and the aperture 104 enable the upper track 44, which is similar to that previously described and shown in FIG. 1, to slide out of the front end of the lower track 300 through the first support member 322 during forward movement of the upper track 44 with respect to the lower track 300. By having the aperture 104 in the end wall 330 of the lower track connecting portion 326 smaller than the bore 18 in the lower track 300, the upper track 44 is allowed to slide through the aperture 104 while retaining the bearing means 70 within the bore 18 of the lower track 300. Since the lower track connecting portion 326 of the first support member 322 is similar to that of the second support member 324, the upper track 44 may slide rearward through the second support member 324 while also retaining the bearing means 70.

In order for the bearing means 70 to provide the proper sliding engagement between the upper track 44 and the lower track 300, a substantially circular flange 335 (only one shown) is provided at each end of the upper track 44, as shown in FIG. 11. The flange 335 is slightly smaller than the bore 18 in the lower track 300 and the aperture 104 in the support members 322, 324 and slightly larger than the bearing means 70. This allows the upper track 44 to slide through the lower track 300 and support members 322, 324 while maintaining the bearing means 70 between the upper track 44 and lower track 300 during all horizontal movement of the upper track 44.

To limit the forward and rearward movement of the upper track 44 relative to the lower track 300, a second embodiment of the stop means is provided. The second embodiment of the support arm 306 has a pair of spaced, L-shaped apertures 336 extending through the support arm 306, as seen in FIG. 11. The corner portion 338 of the support arm 306 defined by the L-shaped aperture 336 extends outward at an acute angle relative to the support arm 306, as seen in FIG. 13. These extending corner portions 338 of the support arm 306 engage the support members 322, 324 to limit the travel of the upper track 44. The integral design of the stop means reduces the number of parts as well as the manufacturing and assembly costs.

To fixedly connect the lower track 300 to the support members 322, 324, each of the side walls 332 of the lower track connecting portion 326 of the support members 322, 324 have a pair of vertically spaced, U-shaped apertures 340 extending therethrough, as seen in FIG. 11. A substantially rectangular portion of tab 342 of the side wall 322 is defined by the surrounding opening of the U-shaped aperture 340. The tabs 342 of each side wall 322 extend inward toward the lower track 300 in a substantially S-shaped configuration, as seen in FIG. 13. The free end 344 of the tabs 342 extend over and hook the ribs 312, 314 of the lower track 300 and are seated within the recesses 316, 320 provided on the back side of the ribs 312, 314, respectively. Each end 344 of the tabs 342 has teeth-like perforations to bite into the lower track 300 in an interference condition to secure the support members 322, 324 to the lower track 300.

The side walls 332 of the lower track connecting portion 326 of the support members 322, 324 have a pair of integral, substantially rectangular tabs 346 extending longitudinally away from the support member 322, 324 when in a preassembled condition, as seen in FIGS. 11 and 13. When assembled, these tabs 346 extend inward into the ribs 312, 314 of the lower track 300 to deform the ribs 312, 314 in an interference condition. The tabs 346 help to secure the lower track 300 to the support members 322, 324.

Figure 15:
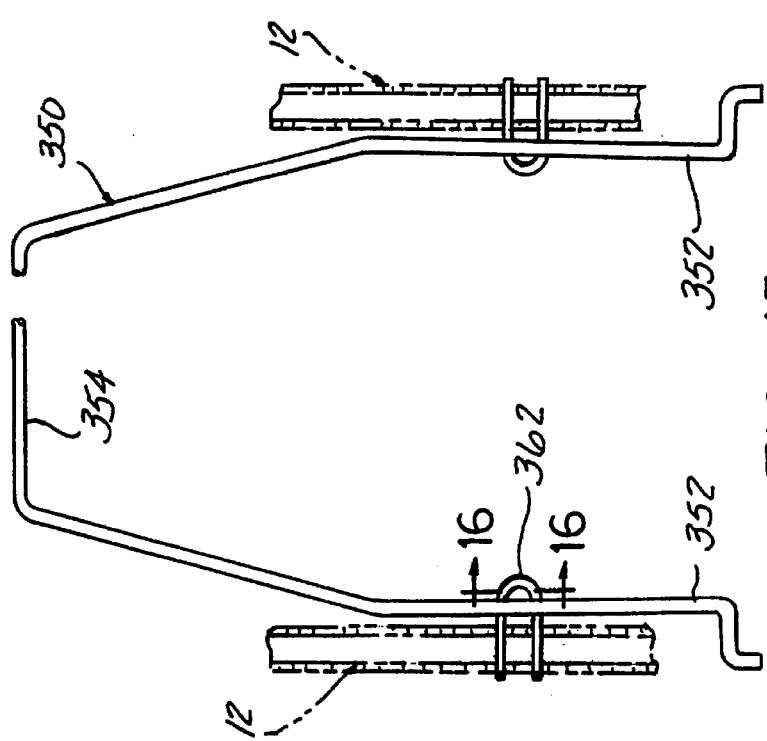
FIG. 15 is a plan view of the handle and the second embodiment of the locking means of the seat adjuster.

In order to reduce the possibility of having the upper track 44 move undesirably relative to the lower track 300, a second embodiment of the locking means is provided, as seen in FIGS. 12 and 15. The releasable locking means provides a U-shaped notch 348 centrally located in the seat support arm 306. The U-shaped notch 348 has its ends extending vertically downward toward the lower track 300 when the seat adjuster 10 is in the normal mounting position on the vehicle floor. A handle 350 in the form of a U-shaped rod is shown having a pair of opposed legs 352 extending into a central bight portion 354 that spans between the first and second track assemblies 12. The opposite ends of the legs 352 are pivotally mounted in an aperture or slot (not shown) formed in one end of in the support arms 306 of the first and second track assemblies 12. This enables the handle 350 to pivot about the ends between a first position, in which the locking means engages the catch means to lock the upper track 44 relative to the lower track 300, and a second, opposite position, in which the locking means disengages the catch means and enables free sliding movement of the upper track 44 relative to the lower track 300.

Each leg 352 of the handle 350 includes a cam follower portion 356 which engages a cam 358 that extends down from the seat support arm 306, as seen in FIG. 13. The cam 358 provides a low friction, plastic cam surface 360 that extends down from the seat support 306 arm and curves inward toward the lower track 300 as the cam surface 360 extends further downward. By reason of the outward diversion of the legs 352, the cam surface 360 acts to stress the handle 350 during upward pivotal movement of the handle 350. The slope of the cam surface 360 is greatest at the beginning of the upward pivotal movement of the handle 350 so that the resiliency is greatest when first pivoting the handle 350 upward. The resiliency of movement to the handle 350 is then reduced as the handle 350 moves upward along the reducing slope of the cam surface 360. The inherent resiliency of the handle 350 resists the compression by the cam surface 360 and serves to urge the handle 350 downward toward the first position. This urges the handle 350 downward into a locked position at all times except when the occupant grasps and pivots the handle 350 upward to the second position to adjust the fore and aft position of the seat.

Figure 16:
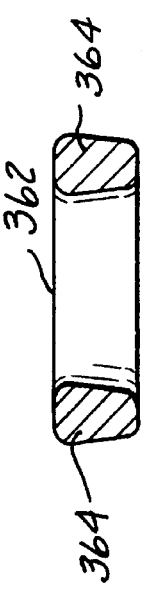
FIG. 16 is a cross-sectional view generally taken along lines 16—16 in FIG. 15 showing the trapezoidal shape of the locking member section.

To engage the catch means, a U-shaped locking member 362 is welded to the underside of each of the legs 352 of the U-shaped handle 350, as seen in FIG. 15. The locking member 362 is substantially perpendicular to the legs 352 of the U-shaped handle 350 and extends through the U-shaped aperture 348 provided in the support arm 306. The locking member 362 need not be U-shaped, but rather it may comprise two separate rods or any number of rods. The cross section of the locking member 362 may be substantially circular to engage the notches 160 provided in the lower track 14 of the first embodiment, as seen in FIG. 2, or the locking member 362 may have a trapezoidal cross section 364, as seen in FIG. 16.

The trapezoidal cross section 364 of the locking member 362 is utilized with the lower track 300 previously described and shown in FIG. 11. The lower track 300 has trapezoidal notches 366 that are similar to the semi-circular notches 160 described in the preferred embodiment in that the trapezoidal notches 366 are open-ended, collinear and spaced in aligned pairs in the upstanding flanges 302, 304 of the lower track 300. The trapezoidal notches 366 also extend laterally across the top ribs 312 of the lower track 300 to form four laterally aligned notches 366 across the lower track 300. Releasing the bight portion 354 of the handle 350, as previously described, allows the locking member 362 to engage the notches 366 in the lower track 300 in a male-female mating configuration. The trapezoidal configuration of the locking member 362 and the notches 366 of the lower track 300, in conjunction with having two locking members 362 versus one locking member 162, allows the locking means to resist a much greater load.

Figure 17:
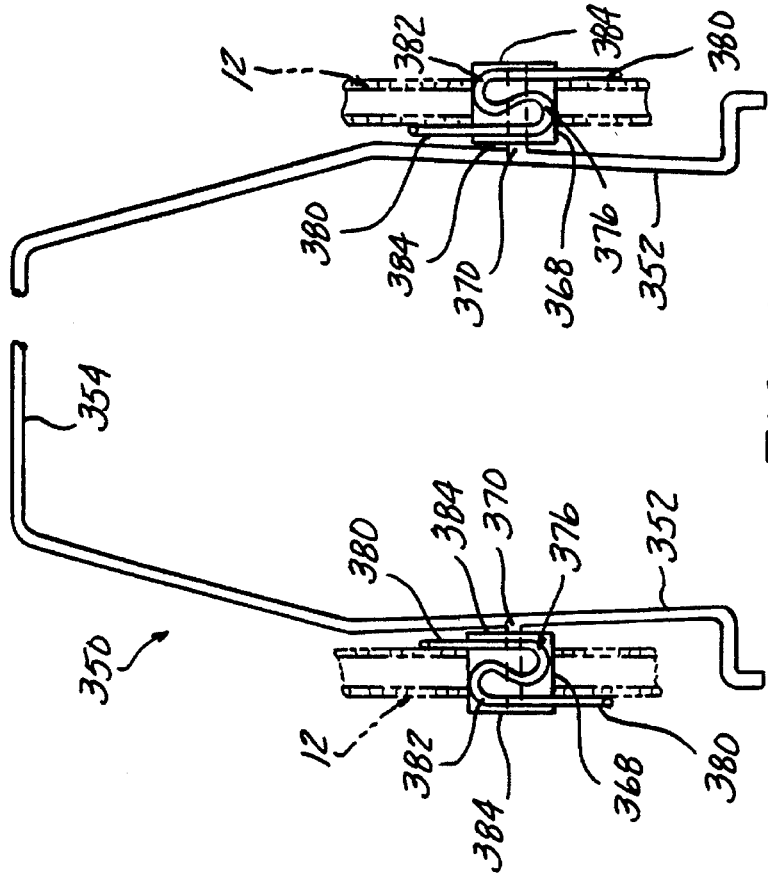
FIG. 17 is a plan view of the handle and the third embodiment of the locking means of the seat adjuster.

A third embodiment of the locking means provides a low inertia locking means for the engagement of a locking member 368 into the notches 366 of the lower track 300, as seen in FIGS. 14 and 17. Again, a U-shaped rod or handle 350 is utilized having a pair of legs 352 extending into a central bight portion 354 of the handle 350. The opposite ends of the legs 352 of the handle 350 are pivotally mounted in the apertures provided in the support arm 306 of the first and second track assemblies 12 previously described. Again, this enables the handle 350 to pivot about its ends between the first position and the second position.

Attached to and extending from the legs 352 of the handle 350 is a single, lightweight rod 370 extending through the U-shaped aperture 348 provided in the support arm 306, as seen in FIGS. 14 and 17. The locking member 368 is U-shaped and substantially rectangular and is seated in and extends through the U-shaped aperture 348 provided in the support arm 306. The ends 372 of the U-shaped locking member 368 extend vertically downward when in the normal mounting position on the vehicle floor so that the ends 372 of the U-shaped locking member 368 extend downward toward the notches 366 of the lower track 300. The ends 372 of the U-shaped locking member 368 have a trapezoidal cross-section, similar to that shown in FIG. 16, so that the U-shaped locking member 368 engages the trapezoidal notches 366 of the lower track 300. The actuating rod 370 extends from the legs 352 of the U-shaped handle 350 under the U-shaped locking member 368 and between the ends 372 of the locking member 368. The U-shaped locking member 368 is operative in response to the upward pivoting of the U-shaped handle 350 as the actuating rod 370 lifts the U-shaped locking member 368 when pivoting the U-shaped handle 350 toward the second position. The actuating rod 370 has a polyurethane or similar coating 374 to prohibit any rattling which may occur between the actuating rod 370 and the U-shaped locking member 368, upper track 44 and lower track 300 during random vibration caused by the normal operation of the vehicle.

To ensure that the locking member 368 engages the notches 366 of the lower track 300, a spring 376 is provided to urge the locking member 368 downward into engagement with the notches 366 of the lower track 300, as seen in FIGS. 14 and 17. The spring 376 has a pair of similar opposite ends 378 which each extend through the L-shaped apertures 336 provided in the support arm 306. The spring 376 has a pair of similar legs 380 which extend angularly downward from the opposite ends 378 of the spring 376 and are integral with an S-shaped configuration 382 that engages and biases the U-shaped locking member 368 toward the notches 366 of the lower track 300. The U-shaped locking member 368 provides a pair of flanges 384 extending upward from its sides to maintain and restrain the S-shaped portion 382 of the spring 376 within the top of the U-shaped locking member 368.

When the handle 350 is released from the second position, the handle 350 and actuating rod 370 provide no resistance to the locking member 368 as the handle 350 and actuating rod 370 fall to the first position independently due to the biasing of the handle 350 by the cam 358. The locking means provides little inertia or resistance towards the locking member 368 engaging the notches 366 of the lower track 300. The downward force of the spring 376 on the locking member 368, causes the locking member 368 to quickly seat within the notches 366 of the lower track 300.

Due to the first and second track assemblies 12 being misaligned and due to various tolerances created within the vehicle seat adjuster 10, the locking member 368 may rest between the notches 366 of the lower track 300 when in the first position, and therefore, the locking member 368 may not fully engage the notches 366 in the lower track 300 thus not locking the upper track 44 with the lower track 300. This may occur to both the first and second track assemblies 12, or it may occur to one of the first and second track assemblies 12 while having the other track assembly fully locked. When the locking member 368 is between the notches 366 of the lower track 300 in the first position, the low inertia of the locking system allows the locking member 368 to quickly engage the notches 366 of the lower track 300 upon horizontal fore and aft movement of the seat. As the seat moves, the locking member 368 is forced into engagement with the notches 366 of the lower track 300 by the downward force of the spring 376. Again, the actuating rod 370 provides no resistance to the locking member 368 as the handle 350 is biased towards the first position by the cam 358.

As previously stated, it may be desirable to place the rollers 82 and the bearing means 70 in different locations depending on the load realized by the bearing means 70. When the vehicle seat is occupied by a passenger, the load of the passenger is almost entirely realized in the rear or towards the back of the seat. This in turn applies a greater load towards the rear of the vehicle seat adjuster 10. Therefore, to compensate for the greater rearward load, it may be desirable to provide a bearing means 386 which utilizes twice as many rollers 82 in the rear 390 of the bearing means 386 as in the front 388 of the bearing means 386, as seen in FIG. 18. The same bearing means 386 is utilized as previously described and shown in FIG. 4, except the cage 72 provides a pair of rows of apertures 392 in the rear 390 of the cage and a single row of apertures 392 in the front 388 of the cage 72. Similar plastic rollers 82 are seated in each aperture 392 of the cage 72, and the bearing means 386 fabricated from similar materials as those previously described and shown in FIG. 4.

In order to make the seat adjuster 10 more environmentally friendly, a last embodiment of the lower track and support means provides a lower track, support means extrusion (not shown) that is extruded from aluminum to form one integral piece. This requires that the lower track portion of the extrusion extend downward to the floor of the vehicle where a pair of extending arms (not shown) are secured to the floor of the vehicle. Since the opening in the end of the support member portion of the extrusion must be the same size as the bore in the lower track portion of the extrusion due to the extrusion process, a simple bearing retaining means (not shown) may be attached to the end of the lower track support member extrusion to retain the bearing means within the lower track portion upon the upper track sliding forward and rearward of the lower track support member extrusion. Such bearing retaining means may be a simple clip that provides an aperture larger than the upper track but smaller than the bearing means. The integral lower track support member extrusion may also provide an integral stop means extending from the ends of the lower track, support member extrusion to limit the rearward and forward travel of the upper track relative to the lower track support member extrusion.

In summary, there has been disclosed a unique seat adjuster which has a low weight and a low manufacturing cost while, at the same time, provides the requisite high strength needed for integrated attachment of the vehicle seat belt directly to the seat adjuster. The present seat adjuster is designed to prevent separation of the upper and lower tracks of the seat adjuster during impact loads imposed on the seat adjuster by the occupant during a vehicle collision.

What is claimed is:

1. A seat adjuster for supporting a vehicle seat on a floor of a vehicle comprising:
   first and second spaced track assemblies, each of the first and second track assemblies including:
   a lower track;
   an upper track having a seat support arm connected thereto;
   means for anchoring a seat belt to said seat support arm;
   means for slidably mounting the upper track to the lower track;
   support means connected to the lower track for mounting the lower track to a floor of a vehicle; and cooperating resisting means, formed in the upper and lower track, for resisting separation of the upper track from the lower track;

a generally U-shaped rod having two legs joined by a central bight portion;

an end of each leg of the U-shaped rod pivotally connected to one of the seat support arms on each upper track, with the two legs extended forwardly to the bight portion extending between the first and second track assemblies;

catch means formed in the seat support arm and the lower track of each of the first and second track assemblies; and locking means operative in response to movement of the U-shaped rod for engaging the catch means upon pivoting of the U-shaped rod about the ends of the legs to a first position and disengaging the catch means upon pivoting the U-shaped rod to a second, opposite position for releasably locking the upper track against movement relative to the lower track.

2. The seat adjuster of claim 1 wherein the cooperating resisting means comprises:

at least one notch formed in and extending longitudinally along one of the upper and lower tracks; and at least one flange formed on and extending longitudinally along the other of the upper and lower tracks, the flange extending outward from the other of the upper and lower tracks into the notch to engage the one of the upper and lower tracks under deformation forces tending to move one end of the upper track through the slot in the lower track.

3. The seat adjuster of claim 2 wherein the cooperating resisting means comprises:

a pair of notches spacedly formed on and extending longitudinally along one of the upper and lower tracks; and a pair of spaced flanges formed on and extending longitudinally along the other of the upper and lower tracks, the flanges extending outward into the notches in the one of the upper and lower tracks to engage the one of the upper and lower tracks under deformation forces tending to move one end of the upper track through the slot in the lower track.

4. The seat adjuster of claim 3 wherein:

the pair of notches are formed in the lower track and open to a bore in the lower track; and the pair of flanges are formed in the upper track.

5. The seat adjuster stated in claim 1 wherein the locking means comprises:

at least two locking members connected to said U-shaped rod for engaging and disengaging the catch means in response to movement of said U-shaped rod for releasably locking the upper track against movement relative to the lower track.

6. The seat adjuster stated in claim 1 wherein the locking means comprises:

a locking member for engaging and disengaging the catch means and releasably locking the upper track against movement relative to the lower track;

means for actuating the locking member into engagement and disengagement of the catch means in response to movement of said U-shaped rod; and means for biasing the locking member toward the catch means.

7. The seat adjuster stated in claim 1 wherein the support means comprises:

a first and second support member each including a vehicle floor mounting portion and a lower track connecting portion; and means for fixedly connecting the lower track connecting portion of each of the first and second support members to opposite ends of the lower track without the use of conventional fasteners.

8. The seat adjuster stated in claim 7 wherein the means for fixedly connecting comprises:

the lower track having a plurality of ribs extending longitudinally along the lower track; and a plurality of tabs integral with and extending from the first and second support member and engaging the plurality of ribs oh the lower track for fixedly connecting the lower track to the first and second support members.

9. The seat adjuster stated in claim 1 wherein the means for slidably mounting the upper track to the lower track comprises:

the lower track having the bore extending longitudinally therethrough and a longitudinally extending slot formed in the lower track and opening to the bore; and the upper track slidably mounted in the bore in the lower track.

10. The seat adjuster stated in claim 9 further comprising:

bearing means disposed in the bore of the lower track between the upper track and the lower track for slidably mounting the upper track to the lower track.

11. The seat adjuster stated in claim 10 wherein the bearing means comprises:

a cage having at least two rows of apertures formed in one end of the cage and at least one row of apertures formed in the other end of the cage; and a roller rollingly mounted in each aperture in the cage and engaging the upper and lower tracks.

12. The seat adjuster of claim 11 wherein:

the upper track has a plurality of angularly disposed exterior faces; and the cage includes a body formed to the shape of the upper track, the apertures being disposed adjacent to one of the faces of the upper track for mounting a roller in contact with one of the faces of the upper track.

13. The seat adjuster stated in claim 9 further comprising:

an aperture formed in the lower track connecting portion of each of the first and second support members sized to permit the upper track to slidingly pass through and to prevent the bearing means from sliding therepast.

14. The seat adjuster stated in claim 7 further comprising:

stop means, integral with each support arm and engagable with the lower track connecting portion of each of the support members, for limiting the maximum extent of movement of the upper track with respect to the lower track in two opposed directions.

15. The seat adjuster stated in claim 14 wherein the stop means comprises:

a first and second projection integral with and extending from the support arm.

16. The seat adjuster of claim 1 wherein the catch means in the lower track comprises:

a plurality of spaced, collinear, open-ended notches formed in the lower track; and the locking assembly having a locking member for releasably engaging the notches of the lower track when the U-shaped rod is pivoted in the first position and disengaging the notches of the lower track when the U-shaped rod is pivoted in the second, opposite position.

17. The seat adjuster stated in claim 16 further comprising:

the notches having a trapezoidal shape, and the locking member of the locking means having a trapezoidal shape for engaging the notches in a male-female mating configuration.

18. The seat adjuster of claim 16 further comprising:

a pair of flanges extending outward from the lower track and forming a slot in the lower track therebetween; and the notches being formed in each flange and aligned flange-to-flange as a plurality of pairs of notches.

19. A seat adjuster for supporting a vehicle seat on a floor of a vehicle comprising:

first and second spaced track assemblies, each of the first and second track assemblies including:

a lower track having a bore extending longitudinally therethrough and a longitudinally extending slot formed in the lower track and opening to the bore;

an upper track slidably mounted in the bore in the lower track;

a seat support arm connected to the upper track and slidably extending outward through the slot in the lower track;

bearing means disposed in the bore in the lower track between the upper track and the lower track for slidably engaging the upper track to the lower track; and cooperating resisting means, formed in the upper and lower tracks, for resisting separation of the upper track from the lower track;

a generally U-shaped rod having two legs joined by a central bight portion;

an end of each leg of the rod pivotally connected to one of the seat support arms on each upper track, with the two legs extending forwardly to the bight portion extending between the first and second track assemblies;

catch means formed in the seat support arm and the lower track of each first and second track assemblies; and locking means operative in response to movement of the U-shaped rod for engaging the catch means upon pivoting of the U-shaped rod about the ends of the legs to a first position and disengaging the catch means upon pivoting the U-shaped rod to a second, opposite position for releasably locking the upper track against movement relative to the lower track.

20. The seat adjuster stated in claim 19 further comprising:

the lower track, upper track and seat support arm being formed of a lightweight metallic material.

21. The seat adjuster stated in claim 19 wherein the locking means comprises:

a U-shaped locking member connected to said U-shaped rod, and said U-shaped locking member having a pair of substantially straight and parallel legs connected by an arcuate portion wherein the pair of substantially straight and parallel legs engage and disengage the catch means upon the U-shaped rod pivoting to the first position and the second, opposite position for releasably locking the upper track against movement relative to the lower track.

22. The seat adjuster stated in claim 19 wherein the locking means comprises:

a U-shaped locking member having a pair of ends for engaging and disengaging the catch means and releasably locking the upper track against movement relative to the upper track;

a lightweight actuating rod connected to and extending from the U-shaped rod and cooperatively engaging the U-shaped locking member for engaging and disengaging the U-shaped locking member into the catch means when pivoting the U-shaped rod to the first position and disengaging the U-shaped locking member therefrom when pivoting the U-shaped rod to the second, opposite position; and means for biasing the locking member toward the catch means.

23. The seat adjuster stated in claim 22 wherein the means for biasing comprises:

a spring having its ends connected to the support arm and having a middle portion engaging the U-shaped locking member for urging the locking member towards the catch means.

24. The seat adjuster of claim 19 wherein the cooperating resisting means comprises:

at least one notch formed in and extending longitudinally along one of the upper and lower tracks; and at least one flange formed on and extending longitudinally along the other of the upper and lower tracks, the flange extending outward from the other of the upper and lower tracks into the notch to engage the one of the upper and lower tracks under deformation forces tending to move one end of the upper track through the slot in the lower track.

25. The seat adjuster of claim 24 wherein the cooperating resisting means comprises:

a pair of notches spacedly formed on and extending longitudinally along one of the upper and lower tracks; and a pair of spaced flanges formed on and extending longitudinally along the other of the upper and lower tracks, the flanges extending outward into the notches in the one of the upper and lower tracks to engage the one of the upper and lower tracks under deformation forces tending to move one end of the upper track through the slot in the lower track.

26. The seat adjuster of claim 25 wherein:

the pair of notches are formed in the lower track and open to the bore in the lower track; and the pair of flanges are formed in the upper track.

27. The seat adjuster stated in claim 19 wherein the support means comprises:

a first and second support member, each including a vehicle floor mounting portion and a lower track connecting portion; and means for fixedly connecting the lower track connecting portion of each of the first and second support members to opposite ends of the lower track without the use of conventional fasteners.

28. The seat adjuster stated in claim 27 wherein the means for fixedly connecting comprises:

the lower track having at least a pair of substantially parallel ribs extending longitudinally along the top and the bottom of the lower track;

a plurality of tabs integral with and extending from the first and second support members for engaging the ribs on the top and the bottom of the lower track for fixedly connecting the lower track to the first and second support members.

29. The seat adjuster stated in claim 27 further comprising:
an aperture formed in the lower track connecting portion of each of the first and second support members and sized to permit the upper track to slidingly pass through and to prevent the bearing means from sliding therepast.

30. The seat adjuster stated in claim 27 further comprising:
stop means, integral with and extending from each support arm and engagable with the lower track connecting portion of each of the support members, for limiting the maximum extent of movement of the upper track with respect to the lower track in two opposed directions.

31. The seat adjuster stated in claim 30 wherein the stop means comprises:
a first and second projection integral with and extending from the support arm.

32. The seat adjuster stated in claim 19 wherein the bearing means comprises:
a cage having at least two rows of apertures formed in one end of the cage and at least one row formed in the other end of the cage; and
a roller formed of a plastic material having high compression resistance rollingly mounted in each aperture in the cage engaging the upper and lower tracks.

33. The seat adjuster of claim 32 wherein:
the upper track has a plurality of angularly disposed exterior faces; and
the cage includes a body formed to the shape of the upper track, the apertures being disposed adjacent to one of the faces of the upper track for mounting a roller in contact with one of the faces of the upper track.

34. The seat adjuster stated in claim 19 wherein the catch means comprises:
a plurality of spaced, collinear, open-ended notches formed in the lower track; and
the locking assembly having a locking member for releasably engaging the notches of the lower track when the U-shaped rod is pivoted to the first position and disengaging the notches of the lower track when the U-shaped rod is pivoted to the second, opposite position.

35. The seat adjuster stated in claim 34 further comprising:
the notches having a trapezoidal shape, and the locking member of the locking means having a trapezoidal shape for engaging the notches in a male-female mating configuration.

36. The seat adjuster of claim 35 further comprising:
a pair of flanges extending outward from the lower track and forming the slot in the lower track therebetween; and
the notches being formed in each flange and aligned flange-to-flange as a plurality of pairs of notches.

37. A seat adjuster for supporting a vehicle seat on a floor of a vehicle comprising:
first and second spaced track assemblies, each of the first and second track assemblies including;
a lower track formed of an extruded lightweight metallic material and having a bore extending longitudinally therethrough and a longitudinally extending slot formed in the lower track and opening to the bore;
an upper track formed of an extruded lightweight metallic material and slidably mounted in the bore and lower track, the upper track having a plurality of angularly disposed exterior faces;
a seat support arm connected to the upper track and slidably extending outward through the slot of the lower track, the upper track and the seat support arm being integrally formed of extruded aluminum;
bearing means disposed in the bore in the lower track between the upper track and lower track for slidingly engaging the upper track to the lower track the bearing means including:
a cage having a pair of adjacent rows of apertures at one end of the cage and having a single row of apertures at the opposite end of the cage formed therein, the cage being disposed between the upper and lower tracks and conformed to the shape of the angularly disposed exterior faces of the upper track with each aperture disposed adjacent to an angularly disposed exterior face of the upper track; and
a roller rollably mounted in each aperture in the cage and engaging the upper and lower tracks, each roller formed of a plastic material having high compression resistance;
support means connected to the lower track without the use of conventional fasteners and mounting the lower track to the floor of a vehicle;
cooperating resisting means, formed in the upper and lower tracks, for resisting separation of the upper track from the lower track in a direction substantially perpendicular to a longitudinal axis of the bore of the lower track, the cooperating resisting means including:
a pair of notches spacedly formed on and extending longitudinally along the lower track and opening to the bore in the lower track; and
a pair of spaced flanges formed on and extending longitudinally along the upper track, the flanges extending outward into the notches in the lower track to engage the lower track under deformation forces tending to move one end of the upper track through the slot and lower track;
a generally U-shaped rod having two legs joined by a central bight portion;
an end of each leg of the rod pivotally connected to one of the seat support arms on each upper track, with the two legs extending forwardly to the bight portion and extending between the first and second track assemblies;
catch means formed in the seat support arm and lower track of each of the first and second track assemblies;
locking means operative in response to movement of the U-shaped rod for engaging the catch means upon the U-shaped rod pivoting to the first position and disengaging the catch means upon the U-shaped rod pivoting to the second, opposite position for releasably locking the upper track against movement relative to the lower track.

38. A seat adjuster for supporting a vehicle seat on a floor of a vehicle comprising:
an elongated lower track connected to said floor and having two longitudinally extending chambers separated by a narrowed passageway having a lateral width less than a maximum lateral width of each of said chambers;
an upper track connected to said vehicle seat and extending through said chambers of said lower track;

means, disposed within one of said chambers, for slidably mounting the upper track within the lower track; and means, extending outwardly from said upper track into the other of said chambers, for cooperatively resisting separation of the upper track from the lower track.

39. The seat adjuster as stated in claim 38, further comprising:

means for releasably locking the upper track against movement relative to the lower track.

40. The seat adjuster as stated in claim 39, wherein said releasable locking means comprises:

catch means formed in said lower track;

a locking member for engaging and disengaging said catch means and releasably locking said upper track relative to said lower track; and means for actuating said locking member into engagement and disengagement with said catch means.

41. The seat adjuster as stated in claim 38, further comprising:

said lower track having a longitudinally extending slot opening into one of said chambers; and a seat support arm connected to said upper track, and said seat support arm slidably extending outward through said slot in said lower track.

42. The seat adjuster as stated in claim 41, further comprising:

means for anchoring a seat belt to said seat support arm.

* * * * *

UNITED STATES PATENT AND TRADEMARK OFFICE
CERTIFICATE OF CORRECTION

PATENT NO. : 5,499,788
DATED : March 19, 1996
INVENTOR(S) : Richard W.A. Rees

It is certified that error appears in the above-indentified patent and that said Letters Patent is hereby corrected as shown below:

Column 14, line 67, before "rod 370" insert --actuating--.

Column 18, line 14, after "ribs", delete "oh" and insert --on--.

Signed and Sealed this

Sixteenth Day of July, 1996

Attest:

BRUCE LEHMAN

Attesting Officer     Commissioner of Patents and Trademarks